(12) United States Patent
Zheng

(10) Patent No.: US 11,896,174 B2
(45) Date of Patent: Feb. 13, 2024

(54) AUTONOMOUS CLEANING DEVICE

(71) Applicant: SHENZHEN FLY RODENT DYNAMICS INTELLIGENT TECHNOLOGY CO.,LTD., Guangdong (CN)

(72) Inventor: Lianrong Zheng, Guangdong (CN)

(73) Assignee: SHENZHEN FLY RODENT DYNAMICS INTELLIGENT TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/554,948

(22) Filed: Dec. 17, 2021

(65) Prior Publication Data
US 2022/0202267 A1 Jun. 30, 2022

(30) Foreign Application Priority Data
Dec. 29, 2020 (CN) .......................... 202011594455.2

(51) Int. Cl.
*A47L 11/40* (2006.01)
*A47L 11/24* (2006.01)
*A47L 11/28* (2006.01)
*G05D 1/02* (2020.01)

(52) U.S. Cl.
CPC .......... *A47L 11/4011* (2013.01); *A47L 11/24* (2013.01); *A47L 11/28* (2013.01); *A47L 11/4008* (2013.01); *A47L 11/4088* (2013.01); *A47L 2201/04* (2013.01); *G05D 1/024* (2013.01)

(58) Field of Classification Search
CPC .. A47L 11/4008; A47L 11/4011; A47L 11/24; A47L 11/28; A47L 2201/04; H01H 1/242
See application file for complete search history.

(56) References Cited

U.S. PATENT DOCUMENTS

| 4,870,229 A * | 9/1989 | Kawase | ................. H01H 13/14 200/5 E |
| 2019/0075990 A1 * | 3/2019 | Jin | ........................ A47L 9/2857 |

FOREIGN PATENT DOCUMENTS

| CN | 211408884 U | * | 9/2020 | |
| CN | 112515557 A | * | 3/2021 | .............. A47L 11/24 |
| DE | 102016118650 A1 | * | 4/2018 | .......... A01D 34/008 |
| JP | 11178765 A | * | 7/1999 | |
| JP | 2021069484 A | * | 5/2021 | |

* cited by examiner

*Primary Examiner* — Michael D Jennings
(74) *Attorney, Agent, or Firm* — CANTOR COLBURN LLP

(57) ABSTRACT

An autonomous cleaning device, including: a casing, a cover, and a switch. The cover is arranged on the casing and protrudes from a top of the casing. The cover and the casing are connected in a manner enabling the cover to be movable downwards and backwards; and the cover has an acting portion. A trigger position of the switch is located at a moving path of the acting portion, and the cover is configured to trigger the switch by the acting portion during movement of the cover. The switch comprises at least two first switches, configured to be triggered in a horizontal direction. A horizontal circumferential trigger range formed by all the at least two first switches is greater than or equal to 180 degrees.

13 Claims, 11 Drawing Sheets

AUTONOMOUS CLEANING DEVICE

CROSS-REFERENCE TO RELATED APPLICATIONS

Pursuant to 35 U.S.C. § 119 and the Paris Convention, this application claims the benefit of Chinese Patent Application No. 202011594455.2 filed Dec. 29, 2020, the contents of which are incorporated herein by reference.

TECHNICAL FIELD

The present application relates to the field of cleaning devices, and more particularly to an autonomous cleaning device.

BACKGROUND

A typical laser ranging module equipped in the autonomous cleaning device generally protrudes from a top of the autonomous cleaning device in order to sense the surrounding environment information. However, the protruding structure is easy to get stuck when entering a bottom of a sofa or bed, or directly collide with the bottom of the sofa or bed. In the absence of corresponding sensor components, the autonomous cleaning device will continue to collide with or get stuck in the corresponding positions and cannot work normally.

A typical detection device is provided with a protective shell, and the laser ranging module is located in the protective shell. The protective shell can rotate relative to the main body of the machine, but such a configuration cannot detect the translation of the protective shell.

SUMMARY

In view of the above technical problems, it is an object of the present application to provide an autonomous cleaning device having a broad detection range.

An autonomous cleaning device, comprises: a casing, a cover, and a switch. The cover is arranged on the casing and protrudes from a top of the casing. The cover and the casing are connected in a manner enabling the cover to be movable downwards and backwards; and the cover has an acting portion. A trigger position of the switch is located at a moving path of the acting portion, and the cover is configured to trigger the switch by the acting portion during movement of the cover. The switch comprises at least two first switches, configured to be triggered in a horizontal direction. A horizontal circumferential trigger range formed by all the at least two first switches is greater than or equal to 180 degrees.

The autonomous cleaning device provided by the present application includes the casing and the cover in connection with the casing in a manner of enabling the cover to be movable downward and backward relative to the casing. The cover has the acting portion. The switch is configured such that the trigger position of the switch is located at the moving path of the acting portion, and the switch can be triggered by the acting portion during the movement of the cover. The cover protrudes from the top of the casing. In use, during the movement of the autonomous cleaning device, the cover protruding from the top of the casing is capable of moving in corresponding directions when being subjected to a downward or backward force, thereby enabling the acting portion to trigger the switch. Such a configuration can detect not only the downward movement of the cover but also the backward movement of the cover, which solves the problem that the traditional detection component cannot detect the translation of the cover and which therefore increases the detection range. The switch comprises at least two first switches that can be triggered in the horizontal direction, and the horizontal circumferential trigger range formed by all the at least two first switches is greater than or equal to 180 degrees. By providing at least two first switches to form the horizontal circumferential trigger range of greater than or equal to 180 degrees, the detection range of the horizontal movement of the cover is increased, and the detection range is further improved.

The horizontal circumferential trigger range being greater than or equal to 180 degrees means that the horizontal circumferential trigger range includes a range of greater than 180 degrees and equal to 180 degrees, that is the horizontal circumferential trigger range is no smaller than 180 degrees.

In an optional embodiment, the horizontal circumferential trigger range is a continuous horizontal circumferential trigger range. The continuous horizontal circumferential trigger range is greater than or equal to 180 degrees, which further increases the detection range. For example, when facing the advance direction of the autonomous cleaning device, both the forward collisions and the side collisions can be detected.

In an optional embodiment, the at least two first switches are contact type switches. Each of the at least two first switches has a button. An orientation of the button of one of the at least two first switches is deviated from a horizontally advance direction of the autonomous cleaning device by an included angle of greater than 0 degree and less than 90 degrees. Different orientations of the first switches may be provided to form different horizontal circumferential trigger range.

In an optional embodiment, both orientations of buttons of two first switches are deviated from the horizontally advance direction of the autonomous cleaning device by included angles of greater than 0 and smaller than 90 degrees, respectively. The orientation of the button of one of the two first switches is deviated to a left side with respect to the advance direction of the autonomous cleaning device. The orientation of the button of the other one of the two first switches is deviated to a right side with respect to the advance direction of the autonomous cleaning device, such that the two first switches face the advance direction of the autonomous cleaning device and at the same time can detect collisions from the front left side and the front right side with respect to the advance direction during the advancement of the autonomous cleaning device. In addition, compared with the single first switch facing the horizontal advance direction of the autonomous cleaning device, when encountering the collisions from the front left direction or the front right direction, such a structure has a smaller angle between the orientation of the button of one of the first switches and the direction of the collisions, thus the sensitivity is higher, and it is solved the problem that the first switch is not sensitive to collisions facing the front left and front right.

In an optional embodiment, both the orientations of the buttons of the two first switches are deviated from the horizontally advance direction of the autonomous cleaning device by included angles of between 30 degrees and 60 degrees, respectively. Thus, the sensitivity to collisions from various angles is more even.

In an optional embodiment, a horizontal pitch is formed between the cover and the casing and is configured to allow the cover to move to trigger the first switch. The autonomous cleaning device further comprises a horizontal elastic member configured for restoring a horizontal displacement of the cover. The horizontal elastic member is arranged between the cover and the casing. The configuration of the horizontal elastic member can restore the horizontal displacement of the cover when the cover is released from a stress state. And compared with the structure adopting a rotatable connection between the cover and the casing, the structure of the present application adopt the horizontal pitch and the horizontal elastic member which function in cushion, and therefore can reduce the damages on the furniture as well as the cleaning device when the cover collides with the furniture.

In an optional embodiment, the horizontal elastic member comprises: an installation bracket and at least two reset buttons. The at least two reset buttons correspond to the at least two first switches, respectively. Orientations of the at least two reset buttons are the same as orientations of buttons of the at least two first switches, respectively. By arranging the reset buttons to be in one-to-one correspondence with the first switches and to have the same orientations as those of the buttons of the first switches, the horizontal displacement of the cover can be restored after the stress state of the cover is removed.

In an optional embodiment, each of the at least two reset buttons comprises: a compression spring and a movable member. The installation bracket extends along an orientation of each of the at least two reset buttons to form a first protrusion. One end of the compression spring is sleeved outside the first protrusion. The movable member has a second protrusion. The other end of the compression spring is sleeved outside the second protrusion, to enable the movable member to be restored when the reset buttons to which the movable member belongs is released from a stress state. Since the two ends of the compression spring are sleeved outside the first protrusion and the second protrusion, respectively, the radial movement of the compression spring is restricted, and the compression spring returns to its original state through the movable member.

In an optional embodiment, the casing has at least two first installation slots, the at least two first installation slots are in one-to-one correspondence with the at least two first switches, and length directions of each of the at least two first installation slots are the same as orientations of each corresponding compression spring of the at least two reset buttons. Each of the at least two first installation slots and each of the at least two reset buttons are in cuboid-shapes. A width of each of the at least two first installation slots matches with a width of each corresponding reset button of the at least two reset buttons, and a length of each of the at least two first installation slots is smaller than a length of each corresponding reset button of the at least two reset buttons, so as to realize the elastic connection between each of the at least two reset buttons and each corresponding first installation slot of the at least two first installation slots. The configuration of the elastic connection between each first installation slot and each reset button makes the installation more convenient. It is only required to press the reset buttons into the respective first installation slots during the installation. Since the reset buttons and the respective first installation slots adopts elastic connections, and exert interaction forces on each other, random shake is therefore avoided during the operation of the autonomous cleaning device.

In an optional embodiment, the acting portion has at least two first pressing plates, and the at least two first pressing plates are arranged in a manner of one-to-one correspond with the at least two first switches. The switch is arranged on the casing. Orientations of pressing surfaces of the at least two first pressing plates are the same as orientations of the buttons of the at least two first switches, respectively. The at least two first pressing plates are respectively located at sides of the at least two first switches facing the advance direction of the autonomous cleaning device, so as to trigger the first switch when the cover is horizontally displaced. The cover has at least two second pressing plates, and the at least two second pressing plates are arranged in a manner of one-to-one correspondence with the at least two reset buttons. Orientations of pressing surfaces of the at least two second pressing plates are the same as orientations of each corresponding reset button of the at least two reset buttons, respectively; and the at least two first pressing plates are respectively located at sides of the at least two reset buttons facing the advance direction of the autonomous cleaning device, so as to restore the cover when a horizontal force exerted on the cover is removed. The first pressing plates are configured to press the corresponding first switches, and the second pressing plates are configured to be pressed by the reset button and thus drive the cover to reset when the applied force is removed.

In an optional embodiment, the orientation of the button of one of the at least two first switches is deviated from the horizontally advance direction of the autonomous cleaning device by an included angle of greater than 0 degree and less than 90 degrees. Thus, the first switches may also detect the up-down movement off the cover, and it is not necessary to arranged additional switches oriented in the vertical direction.

In an optional embodiment, the switch comprises at least one second switch configured to be triggered in a vertical direction. The acting portion further has at least one third protrusion, and the at least one third protrusion is in one-to-one correspondence with the at least one second switch, so as to trigger the second switch when the cover is displaced vertically. The combination of the second switches and the first switches is configured to detect the downward and backward displacement of the cover.

In an optional embodiment, a vertical pitch is formed between the cover and the casing and is configured to allow the cover to move to trigger the switch, and a vertical elastic member is arranged between the cover and the casing and configured to restore a vertical displacement of the cover. The configuration of the vertical elastic member can restore the vertical displacement of the cover when the cover is released from the stress state.

In an optional embodiment, the cover and the casing are in elastic connection via the vertical elastic member, such that the randomly vertical shaking is avoided during the cleaning operation of the autonomous cleaning device.

In an optional embodiment, the autonomous cleaning device further comprises: a controller, configured for performing escape actions. The controller is arranged on the casing and is in electrical connection with the switch. The sensor assembly is in electrical connection with the controller. The sensor assembly is arranged in the cover and protrudes from the top of the casing to sense an environmental information around the autonomous cleaning device. By configuring the controller which is in electrical connection with the switch, once the switch is triggered, the controller can receive a conduction signal and output instructions configured for executing a series of escape actions.

Compared with the existing technology, the autonomous cleaning device provided by the present application includes the casing and the cover in connection with the casing in a manner of enabling the cover to be movable downward and backward relative to the casing. The cover has the acting portion. The switch is configured such that the trigger position of the switch is located at the moving path of the acting portion, and the switch can be triggered by the acting portion during the movement of the cover. The cover protrudes from the top of the casing. In use, during the movement of the autonomous cleaning device, the cover protruding from the top of the casing is capable of moving in corresponding directions when being subjected to a downward or backward force, thereby enabling the acting portion to trigger the switch. Such a configuration can detect not only the downward movement of the cover but also the backward movement of the cover, which solves the problem that the traditional detection component cannot detect the translation of the cover and which therefore increases the detection range. The switch comprises at least two first switches that can be triggered in the horizontal direction, and the horizontal circumferential trigger range formed by all the at least two first switches is greater than or equal to 180 degrees. By providing at least two first switches to form the horizontal circumferential trigger range of greater than or equal to 180 degrees, the detection range of the horizontal movement of the cover is increased, and the detection range is further improved.

For a better understanding and implementation, the present application will be described in detail below in combination with the accompanying drawings.

DETAILED DESCRIPTION OF THE EMBODIMENTS

Figure 1:
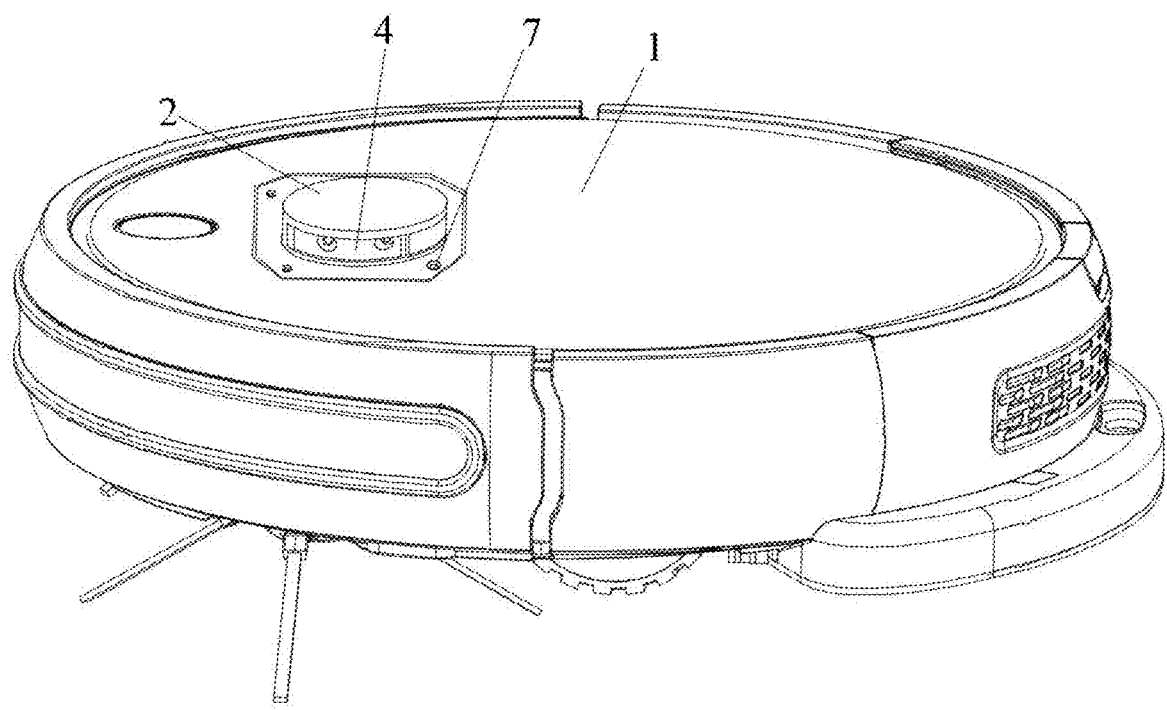
FIG. 1 is a three-dimensional structural view of an autonomous cleaning device according to an embodiment of the present application.

The orientation terms such as up, down, left, right, forward, backward, front, back, top, bottom, etc. mentioned or possibly mentioned in this specification are defined relative to its structure, and are relative concepts, therefore, these orientation terms may change correspondingly according to different locations and different usage conditions. Therefore, these or other orientation terms should not be interpreted as restrictive terms.

The implementation manners described in the following exemplary embodiments do not represent all implementation manners consistent with the present disclosure, but are merely examples of devices consistent with some aspects of the present disclosure as detailed in the appended claims.

The terms used in the present disclosure are only for the purpose of describing specific embodiments, and are not intended to limit the present disclosure. The singular forms of "a", "said", and "the" used in the present disclosure and appended claims are also intended to comprise plural forms, unless the context clearly indicates other meanings. It should also be understood that the term "and/or" as used herein refers to and comprises any or all possible combinations of one or more associated listed items.

The autonomous cleaning device can be classified into commercial autonomous cleaning device and household autonomous cleaning device according to different uses, and can be classified into a floor sweeper, a floor mopping machine, a floor wiping machine, and a floor washing machine according to types.

Downward means a vertical downward direction, when defining the autonomous cleaning device as the center and an advance direction thereof as the forward, the backward means a direction opposite to the advance direction of the autonomous cleaning device. The backward may be either downward-backwards, horizontal backwards, or upward-backwards.

Specifically, taken the downward-backwards as an example, the downward-backwards may refer to a direction that is opposite to the advance direction and at the same time inclined downwards, the inclined angle may be, any positive angle less than 90 degrees, for example, 10 degrees, 30 degrees, 50 degrees, or 80 degrees. In addition, the downward-backwards can be the left downward-backwards, the right downward-backwards, or the direction opposite to the advance direction of the autonomous cleaning device, that is, the direct downward-backwards. Similarly, when defining the autonomous cleaning device as the center and the advance direction thereof as the forward, the horizontal backwards can be the left horizontal backwards, the right horizontal backwards, or the opposite direction of the advance direction, that is, the direct horizontal backwards.

The horizontal circumferential trigger range being greater than or equal to 180 degrees means that the horizontal circumferential trigger range includes a range of greater than 180 degrees and equal to 180 degrees, that is the horizontal circumferential trigger range is no smaller than 180 degrees.

Figure 2:
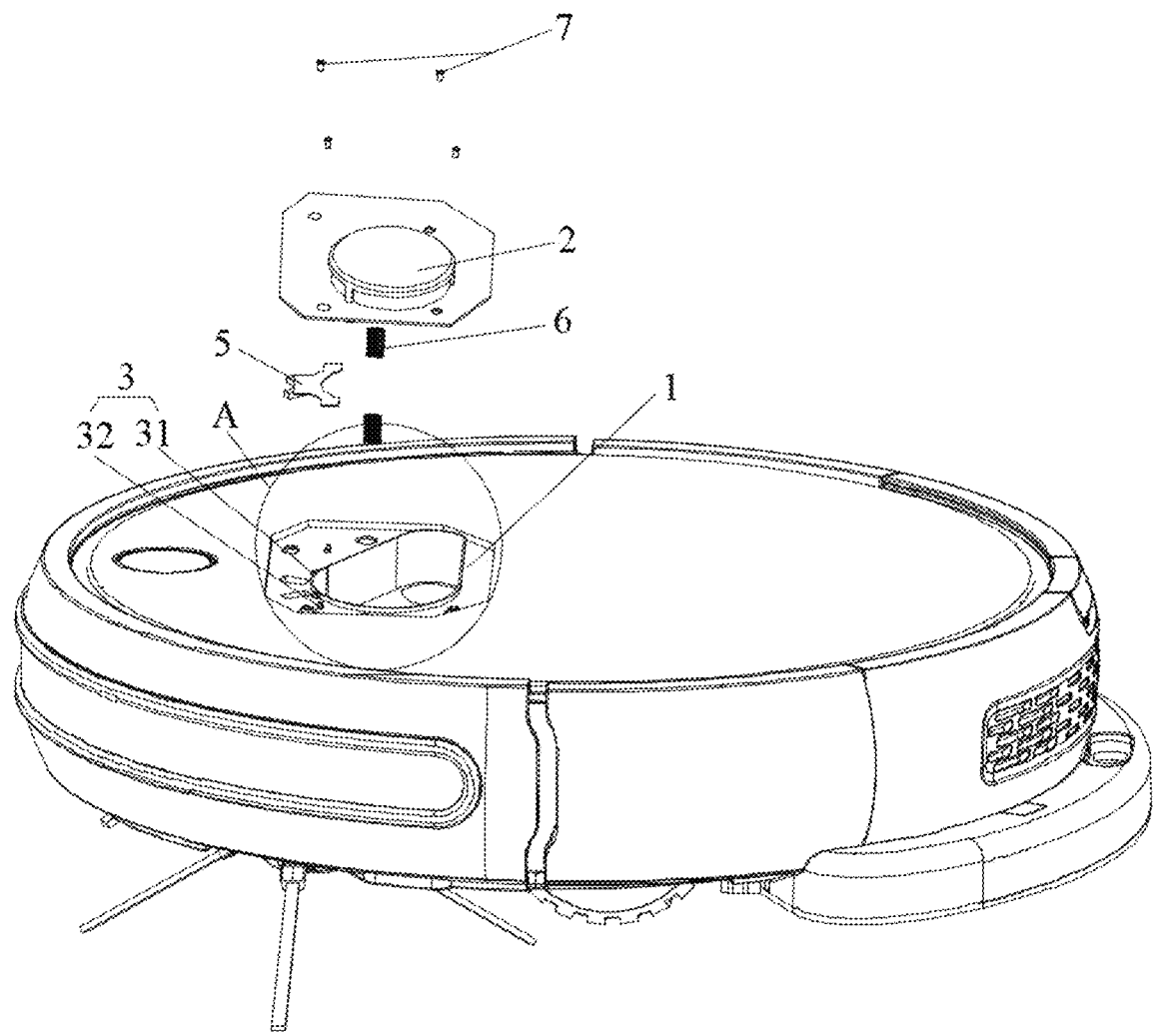
FIG. 2 is a three-dimensional exploded view of a casing and a cover according to an embodiment of the present application.

Referring to FIGS. 1-2, FIG. 1 is a three-dimensional structural view of an autonomous cleaning device according to an embodiment of the present application; and FIG. 2 is a three-dimensional exploded view of the casing and the cover according to an embodiment of the present application.

The autonomous cleaning device provided by the present application comprises: a casing 1, a cover 2, and a switch 3.

The casing 1 comprises an upper casing and a lower casing. Functional parts comprising a traveling wheel assembly, a rolling brush assembly, an air duct assembly, a dust box assembly, and a front impact assembly are supported between the upper casing and the lower casing.

The cover 2 is arranged on the casing 1 and protrudes from a top of the casing 1. The cover 2 and the casing 1 are connected in a manner enabling the cover 2 to be movable downwards and backwards. The cover 2 has an acting portion 21. The acting portion 21 may be a first pressing plate. Details of the acting portion 21 may refer to FIG. 5.

A trigger position of the switch 3 is located at a moving path of the acting portion 21, and the cover 2 is configured to trigger the switch 3 by the acting portion 21 during movement of the cover 2. The switch 3 comprises at least two first switches 31, configured to be triggered in a horizontal direction, and optionally, a second switch 32, configured to be triggered in a vertical direction. A horizontal circumferential trigger range formed by all the at least two first switches 31 is greater than or equal to 180 degrees. The switch 3 can be a contact type switch 3, such as the micro-motion switch 3 and the light touch switch 3, or a non-contact type inductive switch 3, such as a Hall switch 3. In this embodiment, the first switch 31 is a contact type switch 3. The acting portion 21 can trigger the first switch 31 when the acting portion 21 reaches the trigger position during the movement. In such case, a button or action reed of the first switch 31 is also located at the moving path of the acting portion 21. Specifically, orientations of the first switches 31 is shown in FIGS. 7 and 9A-9D, the first switches 31 may be forward first switches 31, that is, the first switches 31 preferably face a travelling direction of the autonomous cleaning device, and all the first switches 31 are preferably contact-type switches, and the first switches 31 each has a button. In other embodiments, the first switches 31 may be non-contact inductive switches 3. In that case, a magnet may be provided at the acting portion 21, and when the acting portion 21 is moved to a trigger position where the magnet can be sensed, the first switches 31 are triggered. Herein, the trigger position is the sensing position where the magnet can be sensed.

Figure 7:
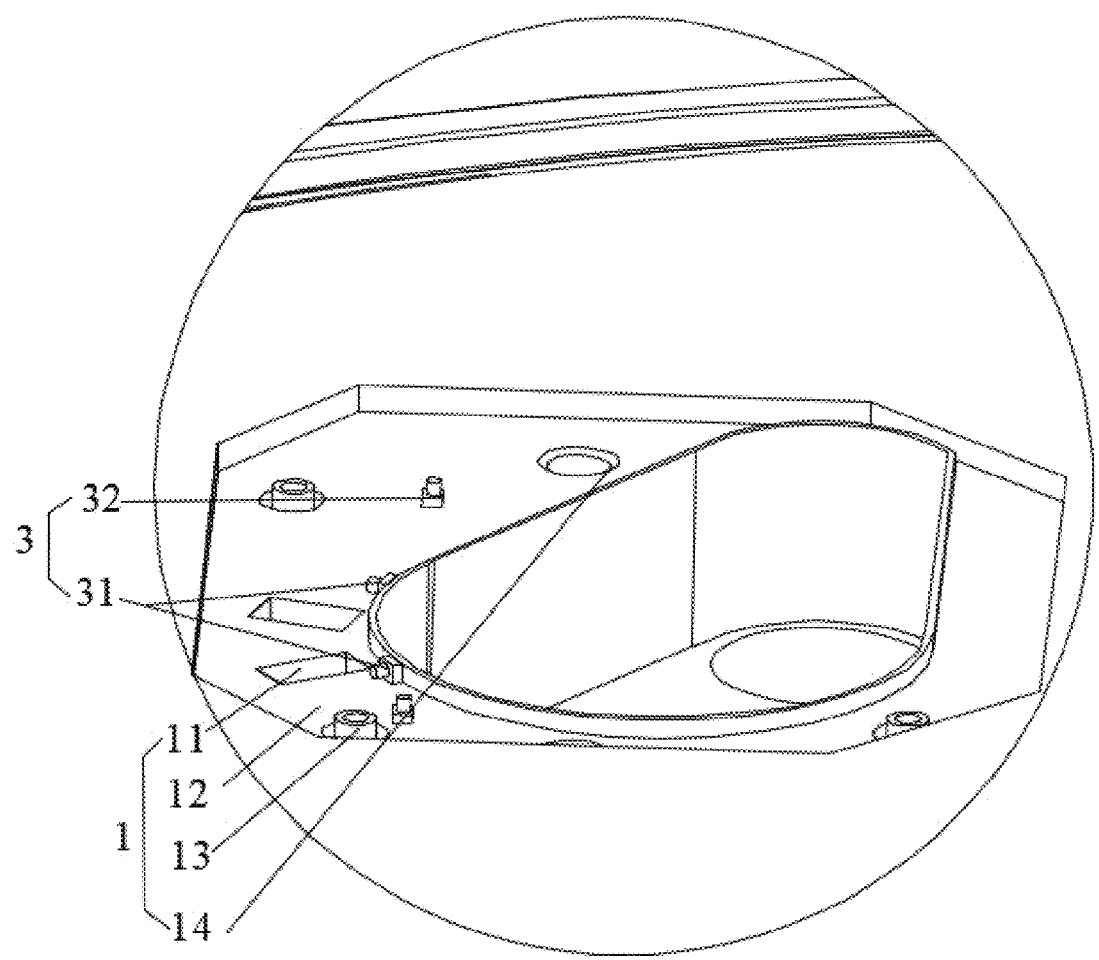
FIG. 7 is a partial enlarged view of Part A taken from FIG. 2.

In this embodiment, a combination of the at least two first switches 31 and the second switch 32 are utilized to enable the trigger position of the switch 3 to be located at the moving path of the acting portion 21, as shown in FIG. 7. In other embodiments, at least two first switches 31 may also be utilized to enable the trigger position of the switch 3 to be located at the moving path of the acting portion 21. Or alternatively, different orientation combinations of the first switches 31 can be utilized to form different detection ranges, as shown in FIGS. 9A-9D.

The sensor assembly 4 is in electrical connection with the controller. The sensor assembly 4 is arranged in the cover 2 and protrudes from the top of the casing 1 to sense an environmental information around the autonomous cleaning device. The sensor assembly 4 may comprise a sensor such as a laser radar, a time of light sensor, a structured light sensor, an ultrasonic sensor, and the like, which may be a single sensor or a sensor module formed by at least two sensors. The sensor assembly 4 is used to perceive single or multiple combined environmental information features such as distance, location, image features, contours, or straight lines.

In order to deal with the stuck situation of the autonomous cleaning device more intelligently, not only can the autonomous cleaning device be configured to detect collisions by the switch 3, but also the autonomous cleaning device can be configured to perform escape actions, so that in case of collision of the cover 2, escape actions can be conducted by the autonomous cleaning device. Specifically, the autonomous cleaning device further comprises: a controller, configured for performing escape actions. The controller is arranged on the casing 1, and the controller is in electrical connection with the switch 3. By configuring the controller which is in electrical connection with the switch 3, once the switch 3 is triggered, the controller can receive a conduction signal and output instructions configured for executing a series of escape actions, including stopping cleaning, shutting down, moving backward or sideways, and turning around by a certain angle for cleaning. The sensor assembly 4 is located in the cover 2, and the cover 2 can be used to protect the sensor assembly 4.

In use, during the movement of the autonomous cleaning device, the cover 2 protruding from the top of the casing 1 is capable of moving in corresponding directions when being subjected to a downward or backward force, thereby enabling the acting portion 21 to trigger the switch 3. Such a configuration can detect not only the downward movement of the cover 2 but also the backward movement of the cover 2, which solves the problem that the traditional detection component cannot detect the translation of the cover 2 and which therefore increases the detection range. The switch 3 comprises at least two first switches 31 that can be triggered in the horizontal direction, and the horizontal circumferential trigger range formed by all the at least two first switches 31 is greater than or equal to 180 degrees. By providing at least two first switches 31 to form the horizontal circumferential trigger range of greater than or equal to 180 degrees, the detection range of the horizontal movement of the cover 2 is increased, and the detection range is further improved.

Figure 3:
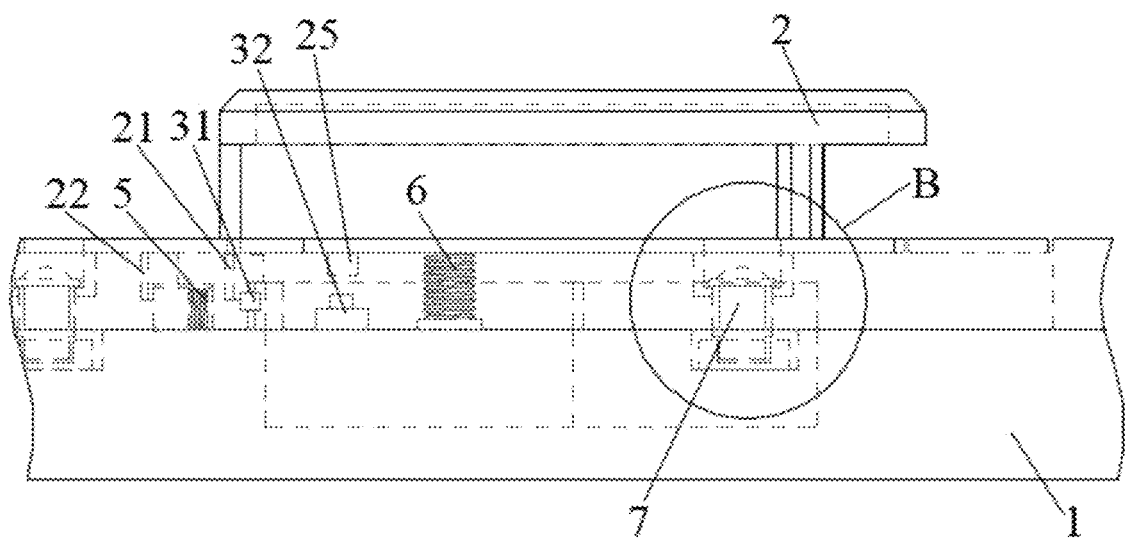
FIG. 3 is a schematic view showing a connection relationship between a casing and a cover according to an embodiment of the present application.

Considering that the cover 2 needs to be restored when being collided, the horizontal elastic member 5 and the vertical elastic member 6 are preferably provided, as shown in FIG. 3. Considering that relative movement between the cover 2 and the casing 1 are needed, a gap is reserved between the cover 2 and the casing 1, and a position limiting piece 7 is utilized to connect the cover 2 and the casing 1, as shown in FIG. 4.

Figure 4:
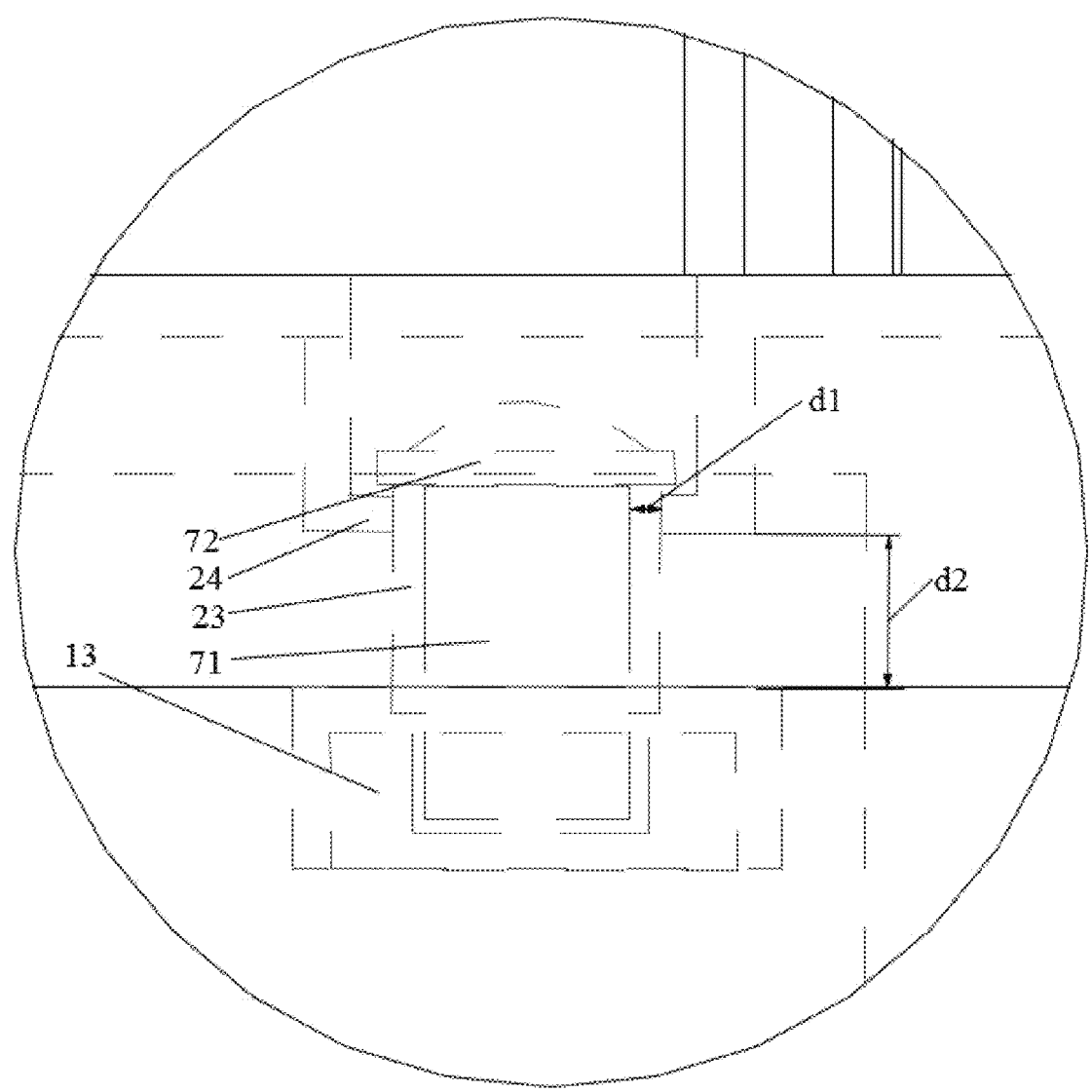
FIG. 4 is a partial enlarged view taken from Part B of FIG. 3.

Referring to FIGS. 3-4, FIG. 3 is a schematic view showing a connection relationship between a casing and a cover according to an embodiment of the present application, and FIG. 4 is a partial enlarged view taken from Part B of FIG. 3.

In order to enable the cover 2 to move relative to the casing 1, a gap can be reserved between the cover 2 and the casing 1, an elastic connection between the cover 2 and the casing 1 is adopted, and the position limiting piece 7 is used to limit the upward movement range of the cover 2. Specifically, a horizontal pitch d1 is formed between the cover 2 and the casing 1 and is configured to allow the cover 2 to move to trigger the first switch 31. The autonomous cleaning device further comprises a horizontal elastic member 5 configured for restoring a horizontal displacement of the cover 2. The horizontal elastic member 5 is arranged between the cover 2 and the casing 1. The configuration of the horizontal elastic member 5 can restore the horizontal displacement of the cover 2 when the cover 2 is released from a stress state. And compared with the structure adopting a rotatable connection between the cover 2 and the casing 1, the structure of the present application adopt the horizontal pitch d1 and the horizontal elastic member 5 which function in cushion, and therefore can reduce the damages on the furniture as well as the cleaning device when the cover 2 collides with the furniture. Moreover, a vertical pitch d2 is formed between the cover 2 and the casing 1 and is configured to allow the cover 2 to move to trigger the switch 3, and a vertical elastic member 6 is arranged between the cover 2 and the casing 1 and configured to restore a vertical displacement of the cover 2. The configuration of the vertical elastic member 6 can restore the vertical displacement of the cover 2 when the cover 2 is released from the stress state.

In order to coordinate with the horizontal return of the cover 2, the acting portion 21 has at least two first pressing plates, and the at least two first pressing plates are arranged in a manner of one-to-one correspond with the at least two first switches 31. When the cover 2 is horizontally displaced, the acting portion 21 triggers the first switch 31. The cover 2 has at least two second pressing plates 22, and the at least two second pressing plates 22 are arranged in a manner of one-to-one correspondence with the at least two reset buttons 52. The reset button 52 can be seen in FIG. 6. After the horizontal force applied to the cover 2 is removed, the horizontal elastic member 5 pushes the second pressing plates 22 to reset the cover 2. The first pressing plates are configured to press the corresponding first switches 31, and the second pressing plates 22 are configured to be pressed by the reset button 52 and thus drive the cover 2 to reset when the applied force is removed. The first pressing plates and the second pressing plates 22 can be seen in FIG. 5 for details. The installation of the horizontal elastic member 5 and the vertical elastic member 6 can be seen in FIGS. 5-7.

It is to be noted that in this embodiment, the switch 3 comprises at least one second switch 32 configured to be triggered in the vertical direction, so as to cooperate with the vertical reset. The number of the second switch 32 is preferably two, and the two second switches are arranged on a left side and a right side of the sensor assembly 4, respectively. The acting portion 21 also has at least one third protrusion 25, and the at least one third protrusion 25 is in one-to-one correspondence with the at least one second switch 32, so as to trigger the second switch 32 when the cover 2 is displaced vertically. The third protrusion can be seen in FIG. 5. The combination of the second switches 32 and the first switches 31 is configured to detect the downward and backward displacement of the cover 2.

Considering the smoothness in the movement of the cover 2 during the operation of the autonomous cleaning device, that is, when the cover 2 is not collided or squeezed, in order to ensure that the cover 2 can be pressed against the casing 1 and thus cannot randomly shake during the traveling of the autonomous cleaning device, in this embodiment, the horizontal elastic member 5 and the vertical elastic member 6 are employed to achieve the elastic connection between the cover 2 and the casing 1, such that the randomly vertical shaking is avoided during the cleaning operation of the autonomous cleaning device. In this way, when the cover 2 is not squeezed or collided, the cover 2 is subjected to a horizontal elastic force exerted by the horizontal elastic member 5 as well as a vertical elastic force exerted by vertical elastic member 6, such that the cover 2 is fixed relative to the casing 1 under the elastic forces in two directions. Specifically, the horizontal elastic member 5 may comprise horizontally arranged compression springs, and the vertical elastic member 6 may comprise vertically arranged compression springs. The elastic connection can be achieved by reserving gaps between the cover 2 and the casing 1 in both the horizontal directions and the vertical direction. That is, by reserving a horizontal pitch d1 and a vertical pitch d2, providing the horizontal elastic member 5 in the horizontal direction between the cover 2 and the casing 1, and providing the vertical elastic member 6 in the vertical direction between the cover 2 and the casing 1, when the cover 2 is subjected to an external force and a horizontal collision occurs, the cover 2 overcomes the elastic force of the horizontal elastic member 5 to move horizontally backward, and once the external force is removed, the cover may return to the original position under the elastic force of member 5; when the cover 2 is subjected to an external force and moves downwards, the cover 2 overcomes the elastic force of the vertical elastic member 6 to move downwards, and once the external force is removed, the cover 2 may return to the original position under the elastic force of the vertical elastic member 6; and when a downward and backward movement of the cover 2 occurs, both the horizontal elastic member 5 and the vertical elastic member 6 act.

It can be understood that in other embodiments, the cover 2 and the casing 1 may not be elastically connected through the vertical elastic member 6 and the horizontal elastic member 5. In such case, the vertical elastic member 6 and the horizontal elastic member 5 function in restoring the horizontally backward movement and the backward movement of the cover 2, respectively. During the operation of the autonomous cleaning device, the cover 2 can move relative to the casing 1. When the cover 2 is squeezed or collided, the vertical elastic member 6 and the horizontal elastic member 5 can restore the movement of the cover 2 caused by the squeezing or collision. Although the cover 2 adopting such a connection manner may also restore the movement of the cover 2 caused by an external force, in the absence of the external force causing the squeezing or collision, the cover 2 and the casing 1 do not apply elastic forces to each other via the springs, therefore, the cover 2 may be prone to shaking and generating noise during the entire operation.

Considering that the cover 2 needs to be restricted in the upward movement range, in this embodiment, the autonomous cleaning device further comprises a position limiting piece 7. The position limiting piece 7 has a rod 71, the cover 2 has an installation hole 23, the casing 1 has an installation portion 13, and the rod 71 passes through the installation hole 23 and is in fixed connection with the installation portion 13. The position limiting piece 7 further has a head 72, the head 72 is in connection with the rod 71, a position limiting portion 24 extends in the installation hole 23 toward the center of the installation hole 23, and the position limiting portion 24 is located beneath the head 72, in order to limit the range of upward movement of the cover 2. A horizontal movable gap is provided between the installation portion 13 and the position limiting portion 24, and such a horizontal movable gap is defined as the horizontal pitch d1. The position limiting portion 24 may be a position limiting hole, the installation portion 13 may be a raised mounting column, a threaded hole is defined in the mounting column for connection with the rod 71, and the horizontal pitch d1 is formed between the outer wall of the mounting column and the inner wall of the position limiting hole. By arrangement of the position limiting piece 7, the rod 71 can be fixedly connected to the casing 1, the head 72 can limit the range of upward movement of the cover 2, and the horizontal movable gap is formed between the installation portion 13 and the position limiting portion 24, to enable the cover 2 to move in the horizontal direction relative to the casing 1. In addition, the downward movement range of the cover 2 and the horizontal movement range can be adjusted by the vertical pitch d2 and the horizontal pitch d1.

Specifically, the position limiting piece 7 may be an integrally connected position limiting piece 7 such as a meson head screw, and in such condition, the head 72 is the head 72 of the meson head screw. The position limiting piece 7 can also be an ordinary screw or bolt, and in such condition, the head 72 is the head 72 of the ordinary screw or bolt. It can be understood that the position limiting piece 7 can also be a split structure formed by an ordinary screw or bolt and an elastic washer connected under the head 72 of the ordinary screw or bolt, and in such condition, the head 72 is the head 72 of the ordinary screw or bolt and the elastic washer. On the one hand, the existence of the elastic washer increases the diameter of the head 72, which can better fit with the installation hole 23, and restrict the upward movement range of the cover; and on the other hand, by increasing the diameter of the elastic washer to enable the diameter increment to be greater than the horizontal movement gap between the installation portion 13 and the position limiting portion 24, the horizontal pitch d1 is reduced.

Figure 5:
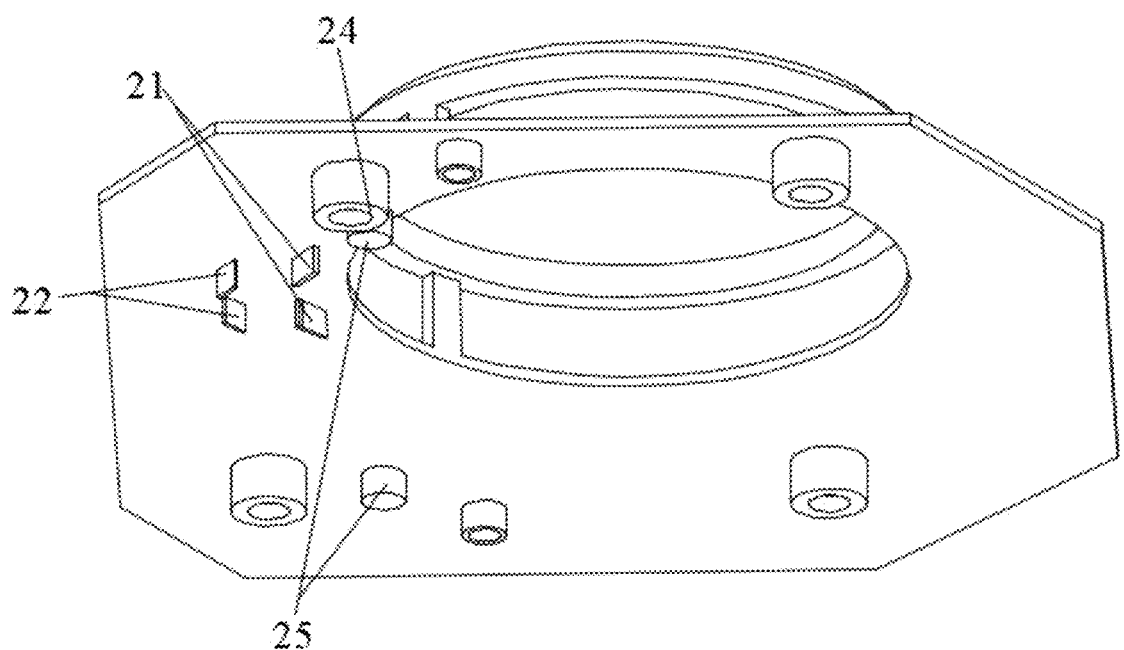
FIG. 5 is a three-dimensional structural diagram of a cover according to an embodiment of the present application.
Figure 6:
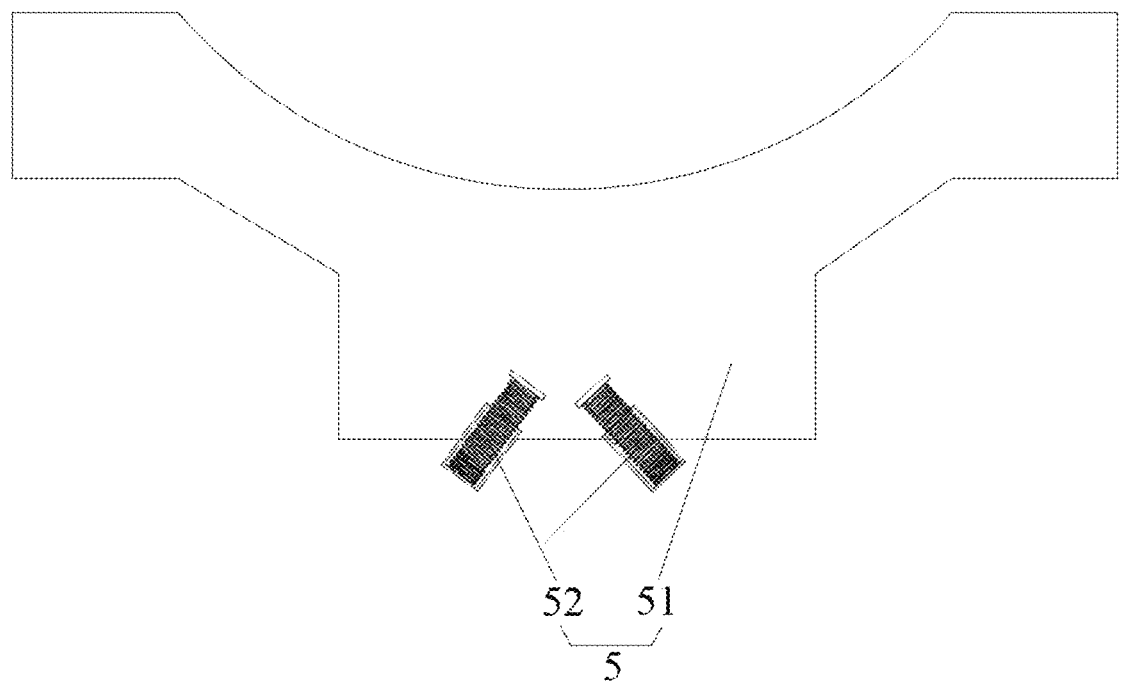
FIG. 6 is a structural schematic view of a horizontal elastic member according to an embodiment of the present application.

Referring to FIGS. 5-7, FIG. 5 is a three-dimensional structural diagram of a cover according to an embodiment of the present application, FIG. 6 is a structural schematic view of a horizontal elastic member according to an embodiment of the present application, and FIG. 7 is a partial enlarged view of Part A taken from FIG. 2.

In this embodiment, all the number of the first switches 31, the second switches 32, the first pressing plates, and the second pressing plates 22 are two, the number of the horizontal elastic member 5 is one, and the horizontal elastic member 5 contains two reset buttons 52. The number of the first installation slots 11 defined in the casing 1 for installing the reset buttons 52, the number of the vertical elastic members 6, and the number of the third protrusions 25 formed at the cover 2 for pressing the second switches 32 are two.

The acting portion 21 may comprise at least two first pressing plates. The number of the at least two first pressing plates corresponds to the number of the at least two first switches 31. The switch 3 is arranged on the casing 1. Orientations of pressing surfaces of the at least two first pressing plates are the same as orientations of buttons of the at least two first switches, respectively. The first pressing plates are respectively located at sides of the at least two first switches 31 facing the advance direction of the autonomous cleaning device, so as to trigger the first switch 31 when the cover 2 is horizontally displaced.

Orientations of pressing surfaces of the at least two second pressing plates 22 are the same as orientations of each corresponding reset button of the at least two reset buttons 52, respectively; and the at least two first pressing plates are respectively located at sides of the at least two reset buttons 52 facing the advance direction of the autonomous cleaning device, so as to restore the cover 2 when a horizontal force exerted on the cover 2 is removed.

In use, when the cover 2 is collided, the cover 2 drives the first pressing plates to press the first switches 31, so as to trigger the first switches 31. When the cover 2 is collided from the front left, one of the first switches 31 having the button facing the front left firstly enables the switch 3 to be triggered, and when the cover 2 is collided from the front right, the other one of the first switches 31 having the button facing the front right firstly enables the switch to be triggered. Thus, the detection range is greater than that of the single first switch 31 facing forward, and the sensitivity is higher. After the cover 2 is released from the force causing the collision, the horizontal elastic members 5 push the second pressing plates 22 to drive the cover 2 to restore.

The cover 2 further comprises a position limiting portion 24. The position limiting portion 24 and the position limiting piece 7 cooperate to limit the horizontal movement range and the vertical movement range of the cover 2.

In this embodiment, the horizontal elastic member 5 comprises: an installation bracket 51, and at least two reset buttons 52.

The installation bracket 51 can be detachably connected to the casing 1 through a threaded connection, or can be clamped to the first installation slot 11 of the casing 1 through the reset button 52;

The at least two reset buttons 52 correspond to the at least two first switches 31, respectively. Orientations of the at least two reset buttons 52 are the same as orientations of buttons of the at least two first switches 31, respectively. By arranging the reset buttons 52 to be in one-to-one correspondence with the first switches 31 and to have the same orientations as those of the buttons of the first switches 31, the horizontal displacement of the cover 2 can be restored after the stress state of the cover 2 is removed. The specific structure of the respective reset button 52 can be seen in FIG. 8.

The casing 1 has at least two first installation slots 11, the at least two first installation slots 11 are in one-to-one correspondence with the at least two first switches 31, and length directions of each of the at least two first installation slots 11 are the same as orientations of each corresponding compression spring of the at least two reset buttons 52. Each of the at least two first installation slots 11 and each of the at least two reset buttons 52 are in cuboid-shapes. A width of each of the at least two first installation slots 11 matches with a width of each corresponding reset button of the at least two reset buttons 52, and a length of each of the at least two first installation slots 11 is smaller than a length of each corresponding reset button of the at least two reset buttons 52, so as to realize the elastic connection between each of the at least two reset buttons 52 and each corresponding first installation slot of the at least two first installation slots 11. The configuration of the elastic connection between each first installation slot 11 and each reset button 52 makes the installation more convenient. It is only required to press the reset buttons 52 into the respective first installation slots 11 during the installation. Since the reset buttons 52 and the respective first installation slots adopts elastic connections, and exert interaction forces on each other, random shake is therefore avoided during the operation of the autonomous cleaning device. In other embodiments, the orientation of each first installation slot 11 and the corresponding first switch 31 may also have a certain angle, such as 5 degrees to 60 degrees, specifically 5 degrees, 10 degrees, 20 degrees, and the like. In such condition, the orientation of the second pressing plate 22 and the orientation of the first installation slot 11 may be the same, and may also have an angle of 5-60 degrees.

FIG. 7 shows that the horizontal circumferential trigger range formed by the two first switches 31 is a continuous horizontal circumferential trigger range, and one of the first switches 31 faces the left front, and the other one of the first switches 31 faces the right front.

In this embodiment, the horizontal circumferential trigger range formed by the two first switches 31 is a continuous horizontal circumferential trigger range. The continuous horizontal circumferential trigger range is greater than or equal to 180 degrees, which further increases the detection range. For example, when facing the advance direction of the autonomous cleaning device, both the forward collisions and the side collisions can be detected. The orientation of the button of one of the at least two first switches 31 is deviated from the horizontally advance direction of the autonomous cleaning device by an included angle of greater than 0 degree and less than 90 degrees. Different orientations of the first switches 31 may be provided to form different horizontal circumferential trigger range. Specifically, both orientations of buttons of two first switches 31 are deviated from the horizontally advance direction of the autonomous cleaning device by included angles of greater than 0 and smaller than 90 degrees, respectively. The orientation of the button of one of the two first switches 31 is deviated to a left side with respect to the advance direction of the autonomous cleaning device, and the orientation of the button of the other one of the two first switches 31 is deviated to a right side with respect to the advance direction of the autonomous cleaning device, such that the two first switches 31 face the advance direction of the autonomous cleaning device and at the same time can detect collisions from the front left side and the front right side with respect to the advance direction during the advancement of the autonomous cleaning device. In addition, compared with the single first switch 31 facing the horizontal advance direction of the autonomous cleaning device, when encountering the collisions from the front left direction or the front right direction, such a structure has a smaller angle between the orientation of the button of one of the first switches 31 and the direction of the collisions, thus the sensitivity is higher, and it is solved the problem that the first switch 31 is not sensitive to collisions facing the front left and front right.

In addition, the casing 1 is provided with a first positioning recess 12 adapted to a shape of the cover 2, and the cover 2 can be directly placed at the first positioning recess 12 of the cover 2, without time-consuming and laborious alignment. The casing defines therein second installation slots 14 configured for installing vertical elastic members 6. The vertical elastic members 6 can be compression springs. The second installation slots 14 can be provided with bosses, the compression springs are sleeved outside the second installation slots 14. Corresponding positions on the cover 2 may also be provided with bosses, the horizontal movement of the compression springs are restricted by the two sets of bosses, respectively. The acting portion 21 further has at least one third protrusion 25, and the at least one third protrusion 25 is in one-to-one correspondence with the second switches 32. The casing 1 is provided with installation portion 13, and the installation portion 13 includes at least two raised installation columns. All the installation columns are arranged around a periphery of the cover 2, for example, four installation columns can be arranged at four corners of the first positioning recess 12.

Preferably, both the orientations of the buttons of the two first switches are deviated from the horizontally advance direction of the autonomous cleaning device by included angles of between 30 degrees and 60 degrees, respectively, thus the sensitivity to collisions from various angles is more even.

In other embodiments, the horizontal circumferential detection ranges of the buttons of the two first switches 31 may not overlap, or vertical collisions may also be detected, as shown in FIGS. 9A-9D.

Figure 8:
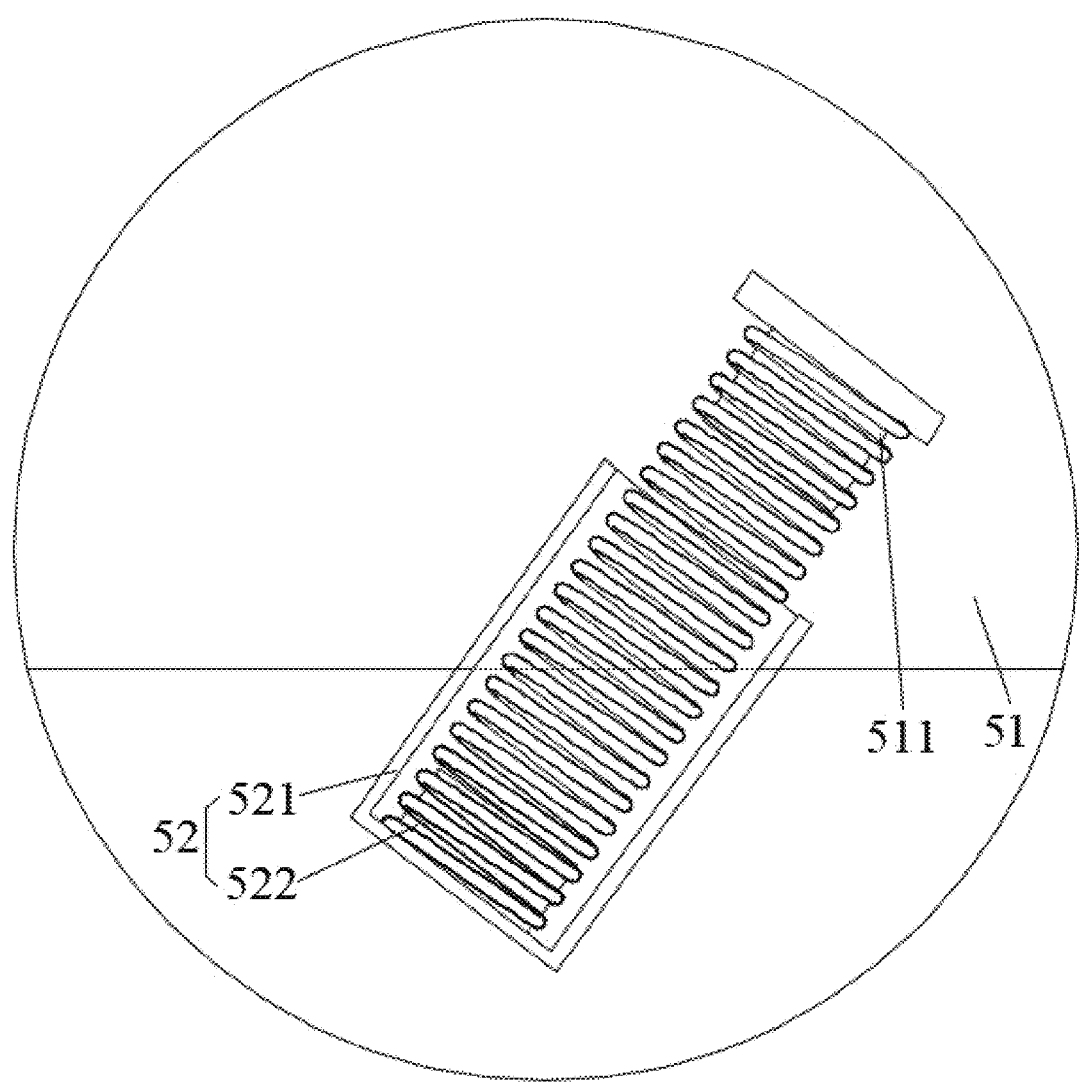
FIG. 8 is a partial enlarged view of Part C taken from FIG. 6.

Referring to FIG. 8, FIG. 8 is a partial enlarged view of Part C taken from FIG. 6.

Each of the at least two reset buttons 52 comprises: a compression spring and a movable member 521. The installation bracket 51 extends along an orientation of each of the at least two reset buttons 52 to form a first protrusion 511. One end of the compression spring is sleeved outside the first protrusion 511. The movable member 521 has a second protrusion 522. The other end of the compression spring is sleeved outside the second protrusion 522, to enable the movable member 521 to return when the reset buttons 52 to which the movable member belongs is released from a stress state. Since the two ends of the compression spring are sleeved outside the first protrusion 511 and the second protrusion 522, respectively, the radial movement of the compression spring is restricted, and the compression spring returns to its original state through the movable member 521. The compression spring can also be tightly sleeved outside the first protrusion 511 and the second protrusion 522. For example, the first protrusion 511 and the second protrusion 522 are cross-shaped protrusions, and both maximum outer diameters of the first protrusion 511 and the second protrusion 522 match with an inner diameter of the compression spring, so as to clamp the compression spring by the cross-shaped protrusions, thereby connecting the movable member 521 to the installation bracket 51.

With reference to FIGS. 9A-9D in combination with FIG. 1, other four implementations of the switch are shown in FIGS. 9A-9D.

Figure 9A:
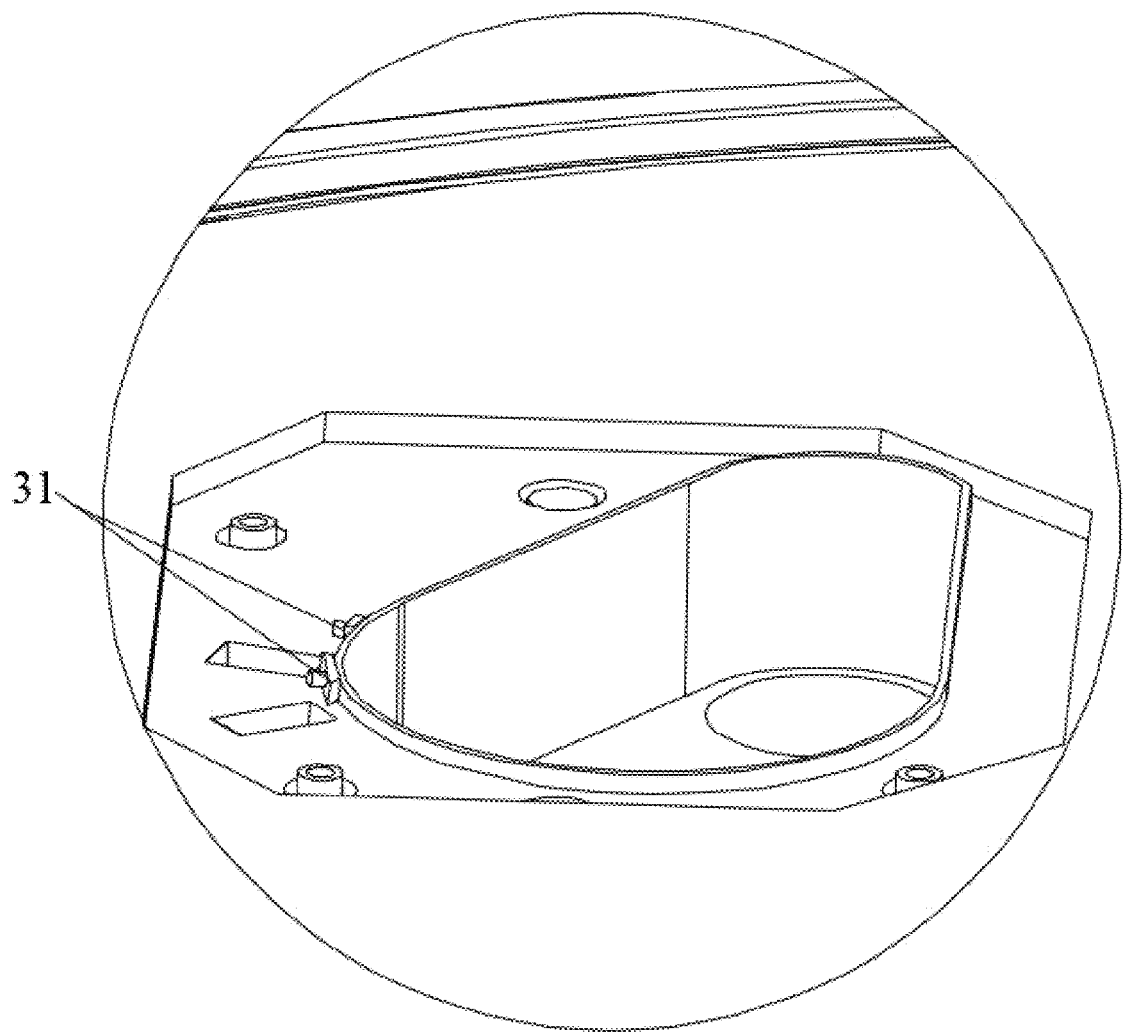
FIGS. 9A-9D illustrate four other implementations of the switch.

FIG. 9A shows that the horizontal circumferential detection range formed by the two first switches 31 are continuous, and an included angle between the orientation of the button of one of the two first switches 31 and the advance direction of the autonomous cleaning device is greater than 0 degree and less than 90 degrees.

The orientation of the button of the other one of the two first switches 31 can face the horizontal advance direction of the autonomous cleaning device. In such condition, compared with the single first switch 31 that faces the horizontal advance direction of the autonomous cleaning device, the detection range can be expanded.

Figure 9B:
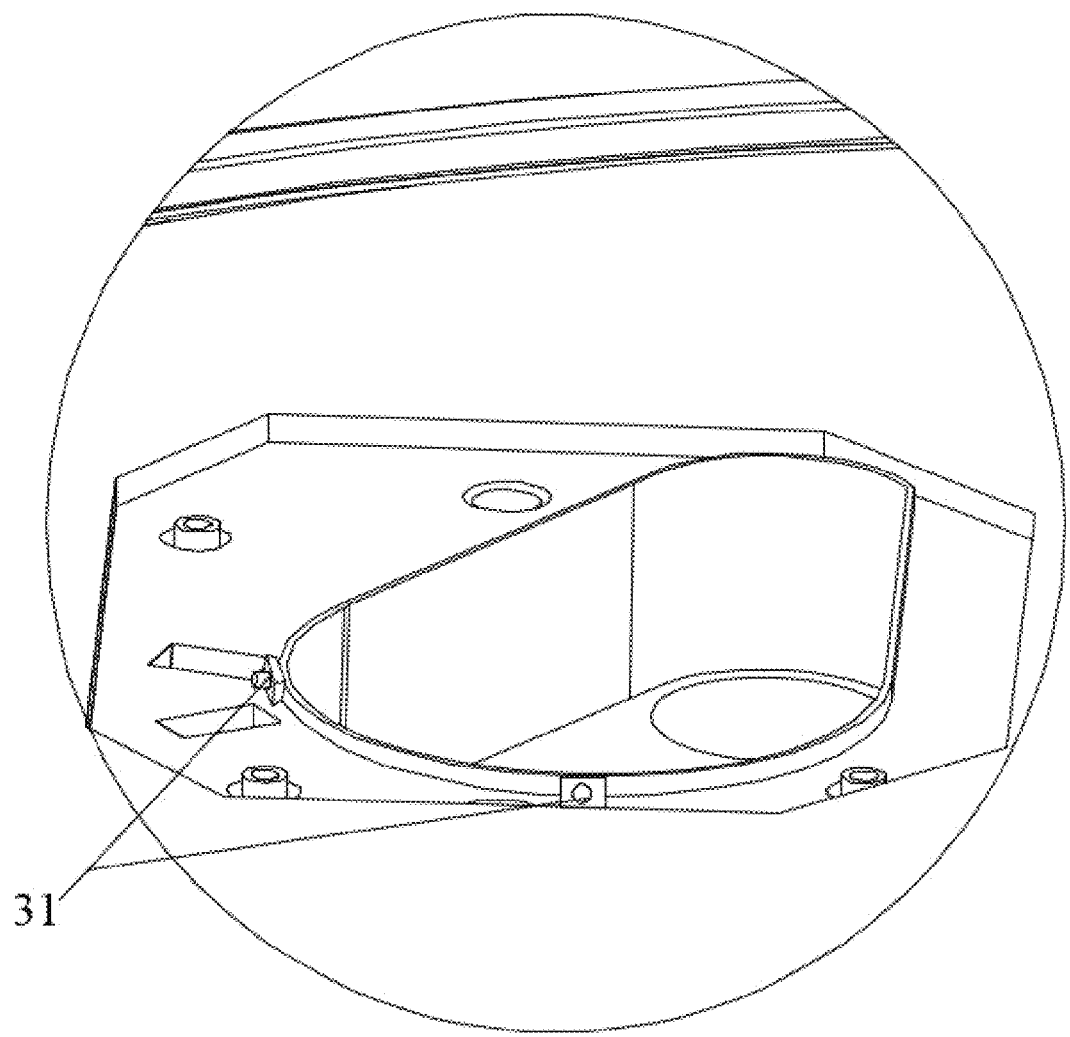

FIG. 9B shows that the horizontal circumferential detection range formed by the two first switches 31 are continuous. One of the two first switches 31 has a button oriented towards the advance direction of the autonomous cleaning device, and the other one of the two first switches 31 has a button oriented towards the front left. It can be understood that another first switch 31 may also be configured at the right side, or still other first switches 31 are respectively arranged at the front, the rear, the left, and the right, and in such case, a horizontally and omni-directionally detection range can be realized.

Figure 9C:
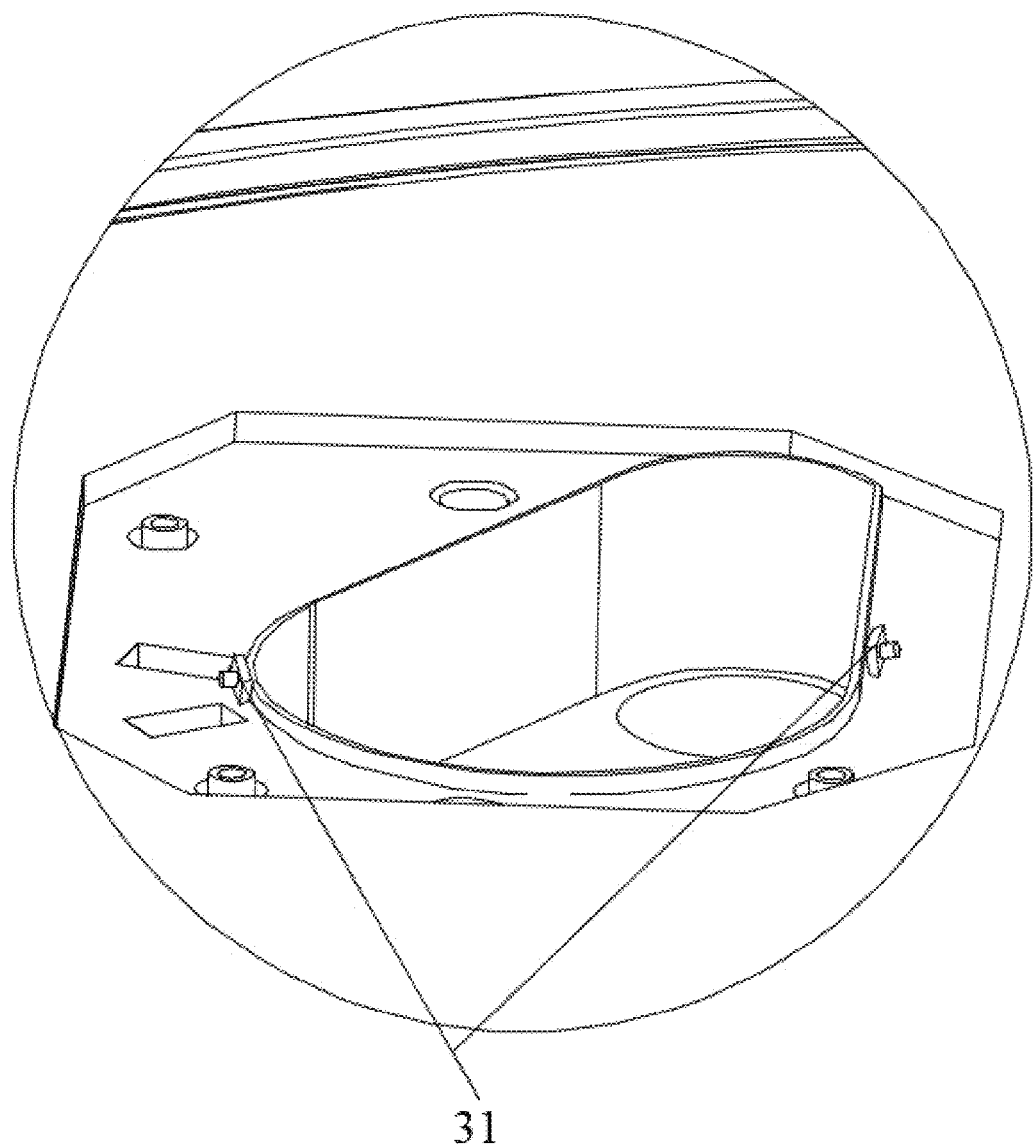

FIG. 9C shows that the horizontal circumferential detection range formed by the two first switches 31 is intermittent, the collision onto the cover 2 from the left and the right cannot be detected, however, compare with the single first switch 31 facing the advance direction of the autonomous cleaning device, the detection range can be enlarged, and the collision during the backward movement can be detected.

Figure 9D:
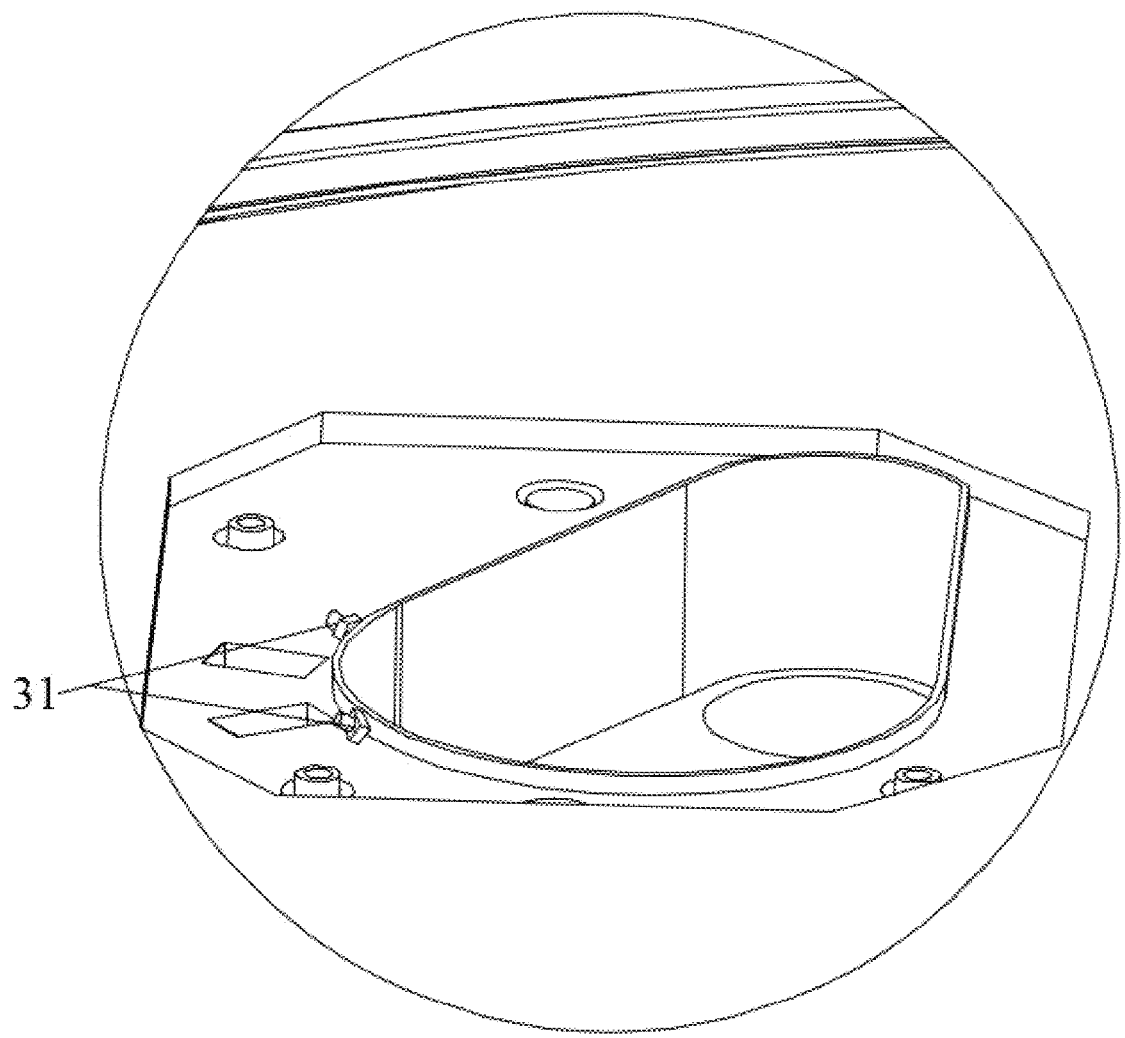

FIG. 9D shows a structure in which two first switches 31 can also detect the downward movement of the cover 2, which is different from the embodiment shown in FIG. 7 in the existence of an angle between the orientation of the button of each first switch 31 and the horizontal surface, thus, the first switches 31 may also detect the up-down movement off the cover 2, and it is not necessary to arranged additional switches 3 oriented in the vertical direction.

All the first switches 31 and the second switches 32 in the above embodiments can be installed in respective mounting slots defined in the casing 1. Or alternatively, protrusions are extended from the casing 1 to enclose into locking positions, so as to clamp the first switches 31 and the second switches 32, respectively. Or alternatively, the first switches 31 and the second switches can be fixed by means of a glue.

Compared with the existing technology, the autonomous cleaning device provided by the present application includes the casing 1 and the cover 2 in connection with the casing 1 in a manner of enabling the cover 2 to be movable downward and backward relative to the casing. The cover 2 has the acting portion 21. The switch 3 is configured such that the trigger position of the switch 3 is located at the moving path of the acting portion 21, and the switch 3 can be triggered by the acting portion 21 during the movement of the cover. The cover 2 protrudes from the top of the casing 1. In use, during the movement of the autonomous cleaning device, the cover 2 protruding from the top of the casing 1 is capable of moving in corresponding directions when being subjected to a downward or backward force, thereby enabling the acting portion 21 to trigger the switch 3. Such a configuration can detect not only the downward movement of the cover 2 but also the backward movement of the cover 2, which solves the problem that the traditional detection component cannot detect the translation of the cover 2 and which therefore increases the detection range. The switch 3 comprises at least two first switches 31 that can be triggered in the horizontal direction, and the horizontal circumferential trigger range formed by all the at least two first switches 31 is greater than or equal to 180 degrees. By providing at least two first switches 31 to form the horizontal circumferential trigger range of greater than or equal to 180 degrees, the detection range of the horizontal movement of the cover 2 is increased, and the detection range is further improved.

The above-mentioned embodiments only several embodiments of the present application, which are descried in a more specific and detailed manner, but should not be understood as limiting the scope of the application. It should be understood that for those skilled in the art, various modifications and improvements can be made without departing from the concept of the present application, and such modifications and improvement fall within the protection scope of the present application.

What is claimed is:

1. An autonomous cleaning device, comprising:
   a casing;
   a cover, wherein the cover is arranged on the casing and protrudes from a top of the casing; the cover and the casing are connected in a manner enabling the cover to be movable downwards and backwards; and the cover has an acting portion; and
   a switch, wherein a trigger position of the switch is located at a moving path of the acting portion, and the cover is configured to trigger the switch by the acting portion during movement of the cover; the switch comprises at least two first switches, configured to be triggered in a horizontal direction; a horizontal circumferential trigger range formed by all the at least two first switches is greater than or equal to 180 degrees;
   wherein the horizontal circumferential trigger range is a continuous horizontal circumferential trigger range;
   the at least two first switches are contact type switches;
   each of the at least two first switches has a button; and
   an orientation of the button of one of the at least two first switches is deviated from a horizontally advance direction of the autonomous cleaning device by an included angle of greater than 0 degree and less than 90 degrees.

2. The autonomous cleaning device according to claim 1, wherein
   both orientations of buttons of two first switches are deviated from the horizontally advance direction of the autonomous cleaning device by included angles of greater than 0 and smaller than 90 degrees, respectively;
   the orientation of the button of one of the two first switches is deviated to a left side with respect to the advance direction of the autonomous cleaning device; and
   the orientation of the button of the other one of the two first switches is deviated to a right side with respect to the advance direction of the autonomous cleaning device.

3. The autonomous cleaning device according to claim 2, wherein
   both the orientations of the buttons of the two first switches are deviated from the horizontally advance direction of the autonomous cleaning device by included angles of between 30 degrees and 60 degrees, respectively.

4. The autonomous cleaning device according to claim 1, wherein
   a horizontal pitch is formed between the cover and the casing and is configured to allow the cover to move to trigger the first switch;
   the autonomous cleaning device further comprises a horizontal elastic member configured for restoring a horizontal displacement of the cover; and
   the horizontal elastic member is arranged between the cover and the casing.

5. The autonomous cleaning device according to claim 4, wherein the horizontal elastic member comprises: an installation bracket and at least two reset buttons; wherein
   the at least two reset buttons correspond to the at least two first switches, respectively; and
   orientations of the at least two reset buttons are the same as orientations of buttons of the at least two first switches, respectively.

6. The autonomous cleaning device according to claim 5, wherein each of the at least two reset buttons comprises:
   a compression spring; wherein the installation bracket extends along an orientation of each of the at least two reset buttons to form a first protrusion; and one end of the compression spring is sleeved outside the first protrusion; and
   a movable member; wherein the movable member has a second protrusion; and an other end of the compression spring is sleeved outside the second protrusion, to enable the movable member to be restored when a reset button of the at least two reset buttons to which the movable member belongs is released from a stress state.

7. The autonomous cleaning device according to claim 6, wherein
   the casing has at least two first installation slots, the at least two first installation slots are in one-to-one correspondence with the at least two first switches, and length directions of each of the at least two first installation slots are the same as orientations of each corresponding compression spring of the at least two reset buttons; and
   each of the at least two first installation slots and each of the at least two reset buttons are in cuboid-shapes; a width of each of the at least two first installation slots matches with a width of each corresponding reset button of the at least two reset buttons, and a length of each of the at least two first installation slots is smaller than a length of each corresponding reset button of the at least two reset buttons, so as to realize an elastic connection between each of the at least two reset buttons and each corresponding first installation slot of the at least two first installation slots.

8. The autonomous cleaning device according to claim 5, wherein
   the acting portion has at least two first pressing plates, and the at least two first pressing plates are arranged in a manner of one-to-one correspond with the at least two first switches; the switch is arranged on the casing; orientations of pressing surfaces of the at least two first pressing plates are the same as orientations of the buttons of the at least two first switches, respectively; the at least two first pressing plates are respectively located at sides of the at least two first switches facing the advance direction of the autonomous cleaning device, so as to trigger the first switch when the cover is horizontally displaced; and the cover has at least two second pressing plates, and the at least two second pressing plates are arranged in a manner of one-to-one correspondence with the at least two reset buttons; and orientations of pressing surfaces of the at least two second pressing plates are the same as orientations of each corresponding reset button of the at least two reset buttons, respectively; and the at least two first pressing plates are respectively located at sides of the at least two reset buttons facing the advance direction of the autonomous cleaning device, so as to restore the cover when a horizontal force exerted on the cover is removed.

9. The autonomous cleaning device according to claim 1, wherein the orientation of a button of one of the at least two first switches is deviated from the horizontally advance direction of the autonomous cleaning device by an included angle of greater than 0 degree and less than 90 degrees.

10. The autonomous cleaning device according to claim 1, wherein the switch comprises at least one second switch configured to be triggered in a vertical direction; and the acting portion further has at least one protrusion, and the at least one protrusion is in one-to-one correspondence with the at least one second switch, so as to trigger the second switch when the cover is displaced vertically.

11. The autonomous cleaning device according to claim 10, wherein a vertical pitch is formed between the cover and the casing and is configured to allow the cover to move to trigger the switch, and a vertical elastic member is arranged between the cover and the casing and configured to restore a vertical displacement of the cover.

12. The autonomous cleaning device according to claim 11, wherein the cover and the casing are in elastic connection via the vertical elastic member.

13. The autonomous cleaning device according to claim 1, further comprising a controller, configured for performing escape actions;

wherein the controller is arranged on the casing and is in electrical connection with the switch;

the controller is arranged on the casing and is in electrical connection with the a sensor assembly is in electrical connection with the controller; and the sensor assembly is arranged in the cover and protrudes from the top of the casing to sense an environmental information around the autonomous cleaning device.

* * * * *